(12) United States Patent
Martin

(10) Patent No.: US 6,708,807 B1
(45) Date of Patent: Mar. 23, 2004

(54) CLUTCH WITH DRUM WEAR CLIPS

(75) Inventor: William A. Martin, Sun City, CA (US)

(73) Assignee: Horstman Manufacturing Co., Inc., Vista, CA (US)

( * ) Notice: Subject to any disclaimer, the term of this patent is extended or adjusted under 35 U.S.C. 154(b) by 0 days.

(21) Appl. No.: 10/242,310

(22) Filed: Sep. 12, 2002

(51) Int. Cl.[7] .............................................. F16D 43/10
(52) U.S. Cl. ............................. 192/70.19; 192/105 C
(58) Field of Search ....................... 192/70.19, 70.2, 192/105 C, 30 W

(56) References Cited

U.S. PATENT DOCUMENTS

| | | | | |
|---|---|---|---|---|
| 3,191,735 A | * | 6/1965 | Wavak | 192/70.2 |
| 3,305,060 A | | 2/1967 | Zeidler | |
| 3,438,464 A | * | 4/1969 | Barrington | 192/70.2 |
| 3,605,967 A | | 9/1971 | Warren et al. | |
| 4,081,064 A | | 3/1978 | Smith et al. | |
| 4,083,434 A | * | 4/1978 | Pinter | 192/70.2 |
| 4,111,291 A | * | 9/1978 | Horstman | 192/105 C |
| 4,225,025 A | | 9/1980 | Crawford | |
| 4,326,614 A | | 4/1982 | Matagrano | |
| 4,574,449 A | * | 3/1986 | Wussow | 29/402.06 |
| 4,625,849 A | | 12/1986 | Gommel | |
| 5,176,268 A | * | 1/1993 | Manley | 213/56 |
| 5,531,306 A | | 7/1996 | Mason | |
| 5,680,918 A | | 10/1997 | Reik et al. | |
| 6,272,725 B1 | * | 8/2001 | Stout, Jr. | 192/70.2 |
| 6,364,076 B1 | * | 4/2002 | Braun et al. | 188/327 |
| 6,409,002 B1 | | 6/2002 | Orlamunder et al. | |
| 6,427,819 B1 | | 8/2002 | Orlamunder | |

* cited by examiner

*Primary Examiner*—Rodney H. Bonck
(74) *Attorney, Agent, or Firm*—Fulwider Patton Lee & Utecht, LLP

(57) ABSTRACT

The clutch includes a wear clip for a clutch which acts as a replaceable wear surface and wear indicator for the cylindrical housing drum of the clutch. The wear clip of the invention is a U-shaped clip that may be formed wear-resistant material, such as carbon steel or aluminum. The cylindrical housing drum of the clutch includes slots for engagement by one or more clutch disks, and a wear clip may be placed in each slot and checked at regular intervals of operation of the clutch and replaced as necessary in order to reduce abrasion of the cylindrical housing drum by the inner components of the clutch and extend the useful life of the clutch.

8 Claims, 3 Drawing Sheets

CLUTCH WITH DRUM WEAR CLIPS

BACKGROUND OF THE INVENTION

This invention relates generally to friction clutches having a cylindrical housing drum, and more particularly relates to clutches with a plurality of slots engaged by one or more clutch disks, and in which the frictional elements engage at a predetermined speed of rotation of a power shaft.

Centrifugal friction clutches which engage at a predetermined rotational speed are particularly useful in combination with internal combustion engines which tend to stall under starting load conditions, by delaying engagement until the engine is operating at a sufficiently high speed to produce enough torque to prevent stalling. One such centrifugal clutch includes a number of plates and discs which move into frictional engagement by pressure exerted by pivoting of weights arranged next to the plates and discs. Such centrifugal friction clutches are also particularly useful in connection with small displacement internal combustion engines such as are used in go-carts, a demanding application of such a clutch in which any unnecessary size and weight can be a disadvantage. Centrifugal clutches are also known in automatic multispeed transmissions, but such transmissions add a considerable amount of size and weight to a small vehicle, and go-carts or one-quarter midget racing vehicles typically are not equipped with transmissions. It is therefore necessary for the clutch to be continually engaged and disengaged.

In such a centrifugal clutch, as the clutch is operated the motion of the inner components of the clutch typically abrades the inside of the cylindrical housing drum of the clutch, requiring replacement of the housing drum and rebuilding of the clutch. In order to combat the problem of wear of the clutch housing, one conventional type of clutch provides a wear shoe for placement within a slotted portion of the clutch housing. Another conventional type of clutch provides wear resistant stop blocks which prevent wear when the clutch pads are expended. It would be desirable to provide a centrifugal clutch with replaceable wear clips to serve as replaceable wear surface and wear indicators that will incur wear from the inner components of the clutch instead of the cylindrical drum during operation of the clutch, and that can be checked at regular intervals and replaced as required, in order to extend the normal useful life of the centrifugal clutch. The present invention meets these needs.

SUMMARY OF THE INVENTION

Briefly, and in general terms, the present invention provides for a wear clip for a clutch which acts as a replaceable wear surface and wear indicator for the cylindrical housing drum of the clutch. The wear clip of the invention is a U-shaped clip that may be formed from a wear-resistant material, such as carbon steel or aluminum. The cylindrical housing drum of the clutch includes slots, and a wear clip of the invention may be placed in each slot and checked at regular intervals of operation of the clutch and replaced as necessary in order to reduce abrasion of the cylindrical housing drum by the inner components of the clutch and extend the useful life of the clutch.

The present invention accordingly provides for an improvement in a clutch for transmission of torque from a rotating input connector means for supplying rotational power to an output connector means for receiving the rotational power, the clutch having frictional surfaces adapted to be engaged at a predetermined engagement speed of rotation of the input connector means, the clutch including a cylindrical housing drum having a plurality of slots, a plurality of clutch plates disposed within the cylindrical housing drum operatively engaged with the input connector means, the plurality of clutch plates including at least one clutch disk having a plurality of flanges engaging the plurality of slots of the cylindrical housing drum, respectively. The improvement in the clutch comprises a plurality of U-shaped wear clips disposed in said slots of said cylindrical housing drum, wherein each of said U-shaped wear clips comprises first and second parallel legs and a middle portion, the first and second legs extending in a perpendicular direction from the middle portion; and first and second pairs of flanges extending outwardly from said first and second legs, respectively, perpendicular to the legs, and forming an outwardly facing U-shaped channel on each of said first and second legs, each of said first and second pairs of flanges forming an interference fit with the plurality of slots of the cylindrical housing drum when the wear clips are inserted in the slots. In a preferred embodiment, the clutch is a centrifugal clutch. In one preferred aspect, the wear clips are formed from wear-resistant material, such as carbon steel or aluminum.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
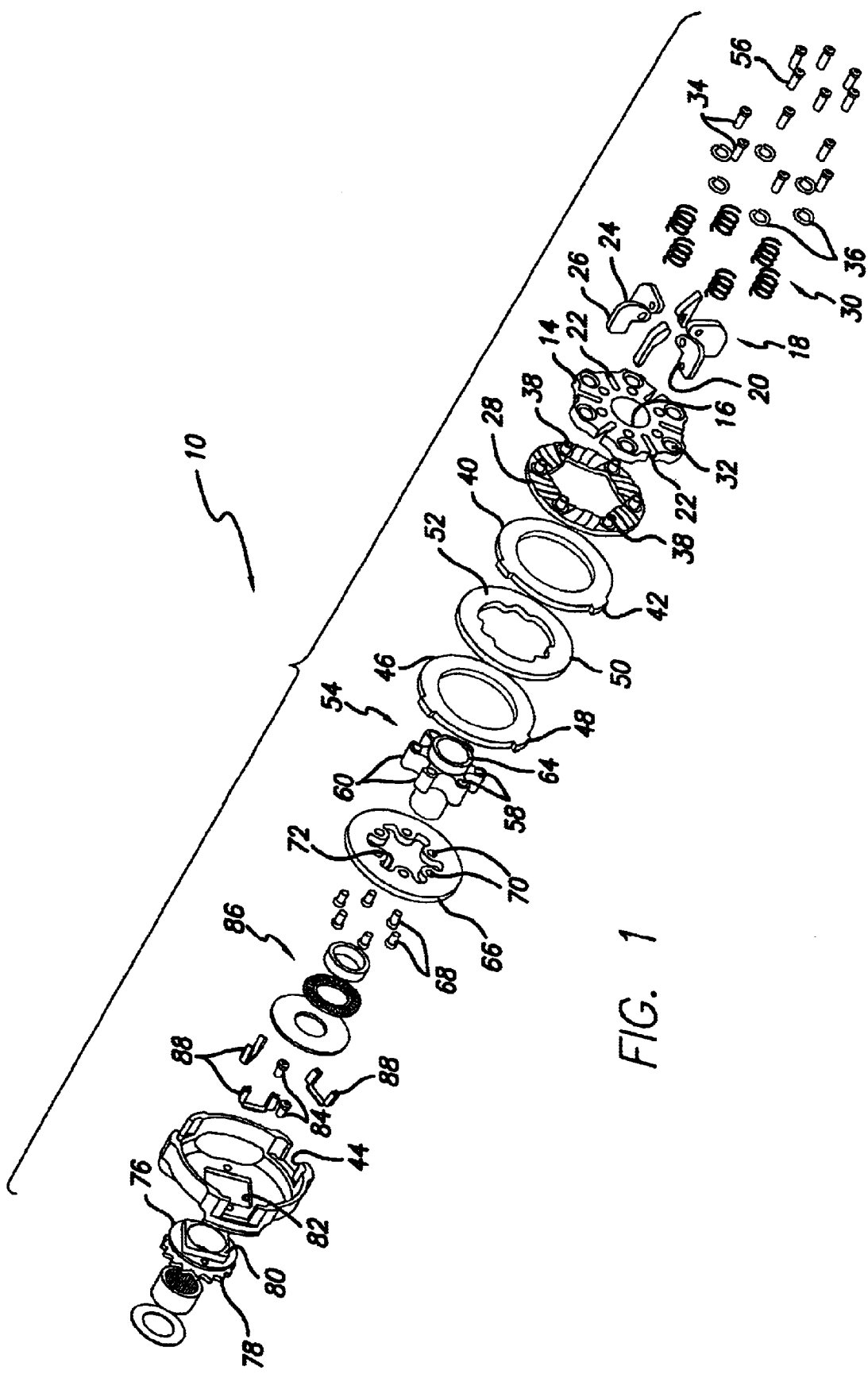
FIG. 1 is an exploded perspective view of a centrifugal clutch separated from a power takeoff shaft from an engine of a vehicle, and illustrating placement of the wear clip of the invention in the cylindrical housing drum of the centrifugal clutch.

As is illustrated in the drawings, the invention is embodied in a clutch, such as a centrifugal clutch 10 that is contained in a generally cylindrical housing drum 12 of the clutch, allowing for transmission of torque from a power input connector such as a power takeoff shaft, for supplying rotational power to an output drive connector, such as a drive hub. The cylindrical drum is preferably coaxially aligned with and surrounds the clutch plates and the clutch disks, with the drum interlocking with the clutch disks, as will be further explained below. As is shown in FIG. 1, the centrifugal clutch includes a generally circular centrifugal force lever support plate 14, typically formed from cast aluminum, and having a central opening 16 allowing the power takeoff shaft to pass therethrough, with a small amount of clearance. Means for applying an adjustable biasing force on the centrifugal force lever support plate towards the clutch disk and the pressure plate, described below, are provided, such as a plurality of centrifugal force levers 18, typically arranged symmetrically about the centrifugal force lever support plate, and having pivot pins 20 mounting each of the centrifugal force levers into corresponding slots 22 of the centrifugal force lever support plate, for example. Other means for mounting the centrifugal force levers on the support plate such as apertures in the centrifugal force levers and a corresponding snap ring retained on the support plate, may also be used. The centrifugal force levers are each preferably made of a plurality of flat parallel leaves arranged perpendicular to the plane of the support plate, and include a drive portion 24 generally to one side of the pivot pins, having the major portion of mass of the force lever, and a radius 26 or cam portion generally on the other side of the aperture, so that as the force levers rotate, the centrifugal force of the drive portion of the force levers urges the radius against a generally flat, circular pressure plate 28.

The means for applying an adjustable biasing force on the support plate towards the clutch disk and the pressure plate, such as by operatively engaging the pressure plate with the centrifugal force lever support plate, in one presently preferred embodiment also comprises a plurality of compression springs 30 placed in countersunk openings 32 in the centrifugal force lever support plate, held in place by a combination of stall speed adjusting screws or spring adjusters 34 and washers 36, screwed in corresponding internally threaded cylindrical stems 38 formed in the pressure plate. The clutch also includes frictional surfaces adapted to be engaged at a predetermined engagement speed of rotation of the power input connector, such as a first clutch disk 40 having friction liners attached to both faces of the clutch disk, and having a plurality of flanges 42 that interlock with openings or slots 44 of the cylindrical housing drum that permit air cooling of the clutch. A second clutch disk 46 may also be provided, having friction liners attached to both faces of the clutch disk, and having a plurality of flanges 48 that also interlock with the slots 44 of the cylindrical housing drum. A floating plate 50 may also be provided between the two clutch disks. The clutch disks are preferably coaxially aligned with the centrifugal force lever support plate, the floating plate and the pressure plate. The clutch disks are adapted to smoothly engage the pressure plate and the friction surfaces 52 (only one of which is shown) of the floating plate.

A main drive support member or drive hub 54 conforms to and fits over a power takeoff shaft (not shown) that typically extends axially through the clutch from an engine (not shown). The drive hub is mounted to the centrifugal force lever support plate by screws or bolts 56 extending through apertures 58 in rounded flanges 60 of the drive hub. The power takeoff shaft engages the tubular shaft 64 of the drive hub, and input power is supplied to the clutch by the power takeoff shaft of an engine. A back plate or fixed plate 66 is also provided, mounted by screws or bolts 68 through apertures 70 in the fixed plate to the centrifugal force lever support plate 14, with slots 72 of the fixed plate engaged with the rounded flanges 60 of the drive hub.

In order to provide an output connector of the torque transmitted through the fixed plate and clutch plates to the cylindrical housing drum of the centrifugal clutch, a sprocket 76, having a plurality of splines 78, includes a raised rectangular key portion 80 that engages rectangular slot 82 of the back face of the cylindrical housing drum of the centrifugal clutch, and is mounted to the back face of the cylindrical housing drum by bolts or screws 84. Additional plates 86 are provided for coupling the drive hub to the cylindrical housing drum.

Figure 2:
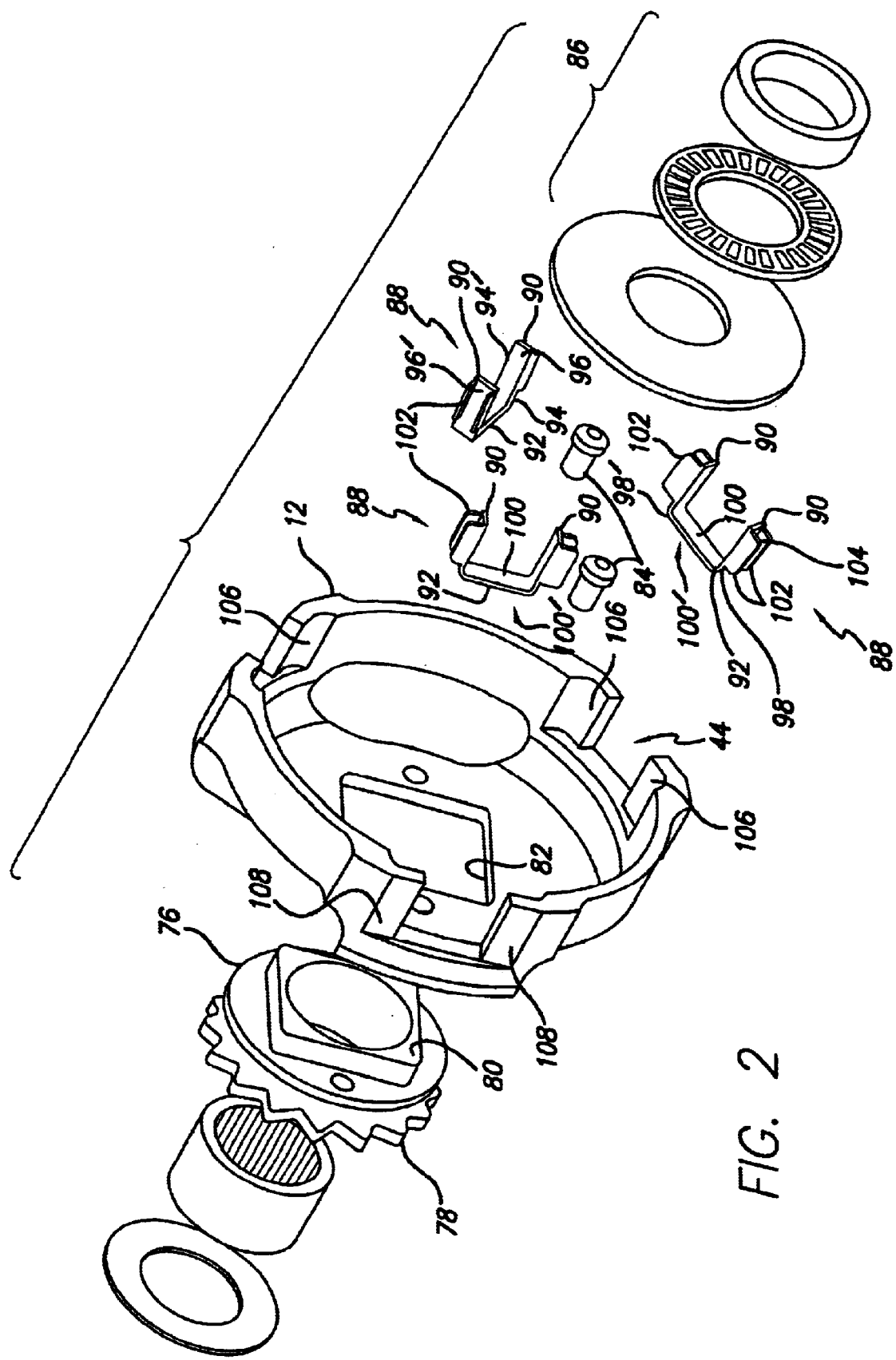
FIG. 2 is an enlarged view of a portion of FIG. 1, illustrating the wear clip of the invention and placement of the wear clip in the cylindrical housing drum of the centrifugal clutch.
Figure 3:
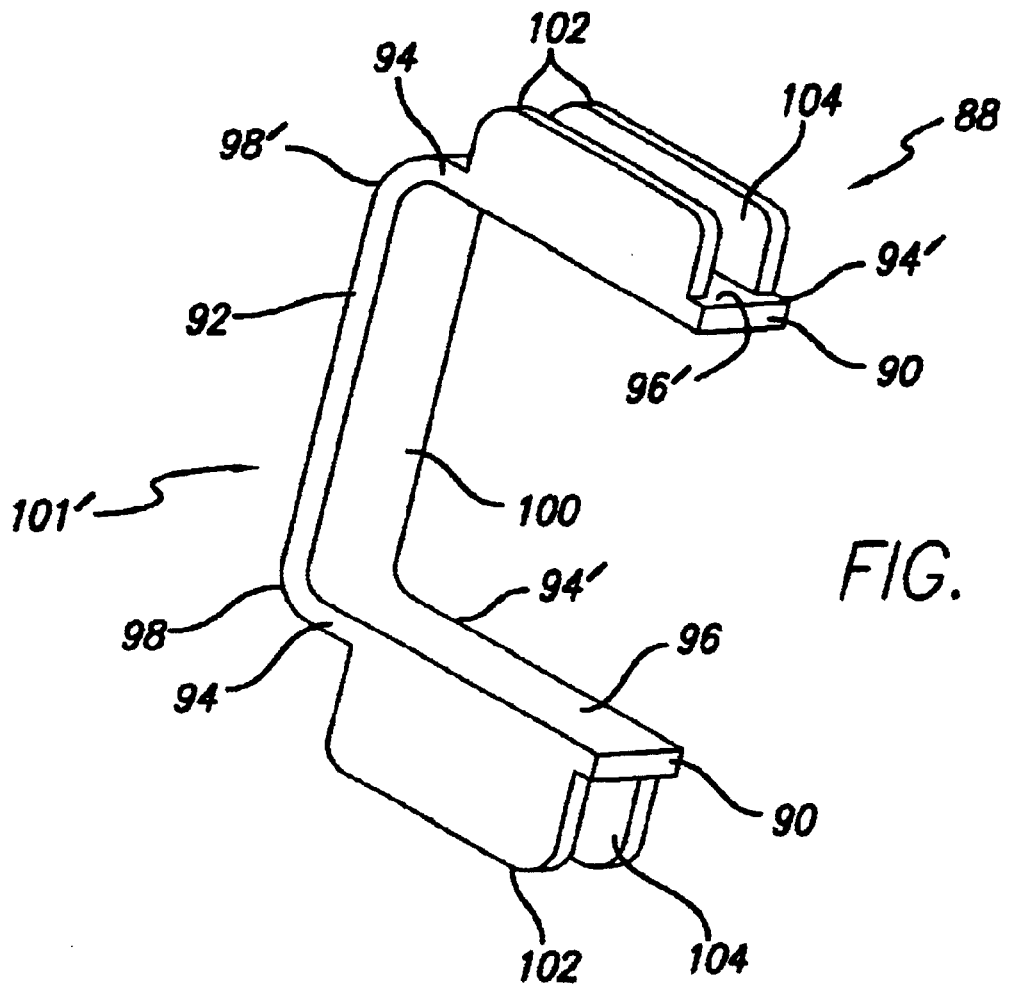
FIG. 3 is an enlarged view of a wear clip according to the invention.

As the centrifugal force lever support plate, pressure plate, clutch disks, floating plate and fixed plate rotate during operation of the centrifugal clutch, these inner components of the centrifugal clutch typically vibrate and become somewhat distorted by heat generated by the operation of the centrifugal clutch, causing these inner components to abrade the inner surface of the cylindrical housing drum. Referring to FIGS. 1, 2 and 3, the present invention advantageously provides for a wear clip 88 that is mounted in the slots 44 of the cylindrical housing drum. The wear clip is generally U-shaped, and includes first and second parallel planar legs 90 extending in a perpendicular direction from the ends of one side of a planar middle portion 92. The first and second planar legs have first and second edges 94, 94', and first and second sides 96, 96', and the planar middle portion has first and second ends 98, 98', and first and second sides 100, 100'. A pair of flanges 102 extends outwardly from the edges of each of the legs of the wear clip perpendicular to the legs, forming an outwardly facing U-shaped channel 104 on each of the legs of the wear clip. The distance between the flanges of each pair of flanges generally corresponds to the thickness of the cylindrical drum housing at the slots of the cylindrical drum housing so as to form an interference fit with the slots when the wear clips are inserted in the slots, so that the flanges of the wear clips will hold the wear clips in place in the slots, while allowing the wear clips to be removed for inspection and replacement when necessary. The wear clip is typically formed from wear-resistant material, such as carbon steel or aluminum, for example, with a thickness sufficient to provide wear protection to the inner surface of the cylindrical drum housing.

In another aspect of the invention, as is illustrated in FIG. 2, the slots 44 of the cylindrical housing drum are generally rectilinear U-shaped slots corresponding to the shape of the wear clip, and are formed to have planar inner edges 106 and planar outer edges 108. Since the clutch plates and floating plate are general circular and the wear clips are generally planar and rectilinear, the wear clips will form a chord across the arc segment of the cylindrical housing drum delineated by each of the slots, and the wear clips will typically first contact and show signs of wear from the inner components of the clutch in the inside facing edges of the middle portions of the wear clips, so that regular inspection and maintenance of the wear clips allows for close control of abrasion of the cylindrical housing drum by the inner components of the clutch during operation.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In a clutch for transmission of torque from a rotating input connector means for supplying rotational power to an output connector means for receiving the rotational power, the clutch having frictional surfaces adapted to be engaged at a predetermined engagement speed of rotation of the input connector means, the clutch including a cylindrical housing drum having a plurality of slots defining corresponding arc segments of the cylindrical housing drum, a plurality of clutch plates disposed within the cylindrical housing drum operatively engaged with the input connector means, the plurality of clutch plates including at least one clutch disk having a plurality of flanges engaging the plurality of slots of the cylindrical housing drum, respectively, the improvement in the clutch comprising:

a plurality of rectilinear U-shaped wear clips disposed in said slots of said cylindrical housing drum, wherein each of said rectilinear U-shaped wear clips includes first and second legs and a middle portion, the first and second legs extending in a perpendicular direction from the middle portion;

first and second pairs of flanges extending outwardly from said first and second legs, respectively, perpendicular to the legs, and forming an outwardly facing rectilinear U-shaped channel on each of said first and second legs, each of said first and second pairs of flanges forming an interference fit with the plurality of slots of the cylindrical housing drum when the wear clips are inserted in the slots; and said slots of said cylindrical housing drum having recessed planar inner edges and recessed planar outer edges such that said rectilinear U-shaped wear clips form a chord across said arc segments of the cylindrical housing drum defined by said slots.

2. The clutch of claim 1, wherein the wear clips are formed from wear-resistant material.

3. The clutch of claim 1, wherein the wear clips are formed from carbon steel.

4. The clutch of claim 1, wherein the wear clips are formed from aluminum.

5. In a centrifugal clutch for transmission of torque from a rotating input connector means for supplying rotational power to an output connector means for receiving the rotational power, the centrifugal clutch having frictional surfaces adapted to be engaged at a predetermined engagement speed of rotation of the input connector means, the centrifugal clutch including a cylindrical housing drum having a plurality of slots defining corresponding arc segments of the cylindrical housing drum, a pressure plate disposed within the cylindrical housing drum, a centrifugal force lever support plate disposed within the cylindrical housing drum adjacent to the pressure plate and having a plurality of apertures therein, the centrifugal force lever support plate being operatively engaged with the input connector means, means for applying an adjustable biasing force on said pressure plate toward said centrifugal force lever support plate, a plurality of centrifugal force levers symmetrically disposed on and pivotally attached to said centrifugal force lever support plate, each of said centrifugal force levers biasing said pressure plate toward said cylindrical housing drum due to centrifugal force exerted on said centrifugal force levers during rotation of said centrifugal force lever support plate, at least one clutch disk disposed within the cylindrical housing drum adjacent to the pressure plate, and having a plurality of flanges engaging the plurality of slots of the cylindrical housing drum, respectively, and a fixed plate disposed within the cylindrical housing drum between the at least one clutch disk and the cylindrical housing drum, and a drive hub disposed within the cylindrical housing drum and engaging the input connector, the drive hub being mounted to the fixed plate, the improvement in the centrifugal clutch comprising:

a plurality of rectilinear U-shaped wear clips disposed in said slots of said cylindrical housing drum, each of said rectilinear U-shaped wear clips including first and second planar legs and a planar middle portion, the first and second planar legs extending in a perpendicular direction from the planar middle portion;

first and second pairs of flanges extending outwardly from said first and second legs, respectively, perpendicular to the legs, and forming an outwardly facing rectilinear U-shaped channel on each of said first and second legs, each of said first and second pairs of flanges forming an interference fit with the plurality of slots of the cylindrical housing drum when the wear clips are inserted in the slots; and said slots of said cylindrical housing drum having recessed planar inner edges and recessed planar outer edges such that said rectilinear U-shaped wear clips form a chord across said arc segments of the cylindrical housing drum defined by said slots.

6. The centrifugal clutch of claim 5, wherein the wear clips are formed from wear-resistant material.

7. The centrifugal clutch of claim 5, wherein the wear clips arc formed from carbon steel.

8. The centrifugal clutch of claim 5, wherein the wear clips are formed from aluminum.

* * * * *